(12) United States Patent (10) Patent No.: US 8,260,049 B2
Deryagin et al. (45) Date of Patent: Sep. 4, 2012

(54) MODEL-BASED METHOD OF DOCUMENT LOGICAL STRUCTURE RECOGNITION IN OCR SYSTEMS

(75) Inventors: Dmitry Deryagin, Moscow (RU); Konstantin Anisimovich, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 820 days.

(21) Appl. No.: 12/236,054

(22) Filed: Sep. 23, 2008

(65) Prior Publication Data

US 2009/0087094 A1 Apr. 2, 2009

Related U.S. Application Data

(60) Provisional application No. 60/976,348, filed on Sep. 28, 2007.

(51) Int. Cl.
*G06K 9/34* (2006.01)
(52) U.S. Cl. .................................. 382/173; 382/180
(58) Field of Classification Search .............. 382/171, 382/176, 173, 199
See application file for complete search history.

(56) References Cited

U.S. PATENT DOCUMENTS

| | | |
|---|---|---|
| 5,129,076 A | 7/1992 | Freeman et al. |
| 5,159,667 A | 10/1992 | Borrey et al. |
| 5,669,007 A | 9/1997 | Tateishi |
| 5,784,487 A | 7/1998 | Cooperman |
| 5,926,823 A | 7/1999 | Okumura et al. |
| 5,937,084 A | 8/1999 | Crabtree et al. |
| 6,377,704 B1 | 4/2002 | Cooperman |
| 6,694,053 B1 | 2/2004 | Burns et al. |
| 6,922,697 B1 | 7/2005 | Suehira |
| 6,963,871 B1 | 11/2005 | Hermansen et al. |
| 7,020,664 B1 | 3/2006 | Yamaguchi et al. |
| 7,197,510 B2 | 3/2007 | Abe et al. |
| 7,305,613 B2 | 12/2007 | Oezgen |
| 7,370,059 B2 | 5/2008 | Geraud |
| 7,392,473 B2 | 6/2008 | Meunier |
| 7,539,698 B2 | 5/2009 | Sakaniwa et al. |
| 7,831,098 B2 * | 11/2010 | Melikian ............... 382/215 |
| 2004/0264774 A1 * | 12/2004 | Anisimovich et al. ...... 382/173 |
| 2007/0239435 A1 | 10/2007 | Stuhec |

* cited by examiner

*Primary Examiner* — Duy M Dang
(74) *Attorney, Agent, or Firm* — John Chandler Meline; LeighAnn Welland

(57) ABSTRACT

In one embodiment, the invention provides a method for determining a logical structure of a document. The method comprises generating at least one document hypothesis for the whole document; for each document hypothesis, verifying said document hypothesis including (a) generating at least one block hypothesis for each block in the document based on the document hypothesis; and (b) selecting a best block hypothesis for each block; selecting as a best document hypothesis the document hypothesis that has the best degree of correspondence with the selected best block hypotheses for the document; and forming the document based on the best document hypothesis.

23 Claims, 6 Drawing Sheets

MODEL-BASED METHOD OF DOCUMENT LOGICAL STRUCTURE RECOGNITION IN OCR SYSTEMS

This application claims the benefit of priority to U.S. 60/976,348, filed Sep. 28, 2007, the specification of which is hereby incorporated by reference.

FIELD

Embodiments of the present invention are directed towards the implementation of a method and system for Optical Character Recognition and Intelligent Character Recognition OCR (ICR) that is capable of handling documents.

BACKGROUND

OCR systems may used to transform images of paper documents into a computer-readable and computer-editable form which is searchable. OCR systems may also be used to extract data from such images. A typical OCR system consists of an imaging device that produces the image of a document and software that runs on a computer that processes the images. As a rule, this software includes an OCR program, which can recognize symbols, letters, characters, digits, and other units and compound them, if they are arranged next to each other, into words, which may then be checked by means of a dictionary. Traditional OCR systems output plain text, which typically has simplified layout and formatting, retaining only paragraphs, fonts, font styles, font sizes, and some other simple properties of the source document.

However, a document may be regarded not only as text, but as an object with a physical and a logical structure.

The physical structure or document layout is in fact what makes text information a document. Physical structure is intended to keep information in an ordered form for proper and better presentation. It manifests itself as the physical arrangement of form elements such as images, tables, columns, etc. An OCR program may detect the position of form elements in a document and reconstruct them but it does not understand the purpose or meaning of the form elements. Further, the OCR program does not understand the relations between the various form elements.

The logical structure of the document maps the form elements into one or more logical blocks based on an understanding of the meaning of the form elements and the relations between them. The logical structure is what controls the logical ordering (e.g., viewing and reading order) of the information in a document. The logical structure includes information about the purpose and/or meaning of all form elements and defines the reading order in which the information contained in the document should be perceived. It is tightly linked with the document's physical structure and depends on the relations among the various formatting elements and their reading priorities.

The logical structure may not be so obvious from the usual, human's point of view. In most cases a "human reader" comprehends the logical structure of documents automatically; it is self-evident to him and inseparable from the document's physical structure. But this human perception is not characteristic of computers and, in particular, of OCR and document conversion programs. The logical structure of a document is beyond the traditional "machine comprehension" and may become a bottleneck in automated document recognition.

SUMMARY

In one embodiment, the invention provides a method for determining a logical structure of a document. The method comprises generating at least one document hypothesis for the whole document; for each document hypothesis, verifying said document hypothesis including (a) generating at least one block hypothesis for each block in the document based on the document hypothesis; and (b) selecting a best block hypothesis for each block; selecting as a best document hypothesis the document hypothesis that has the best degree of correspondence with the selected best block hypotheses for the document; and forming the document based on the best document hypothesis.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

DETAILED DESCRIPTION

Figure 1:
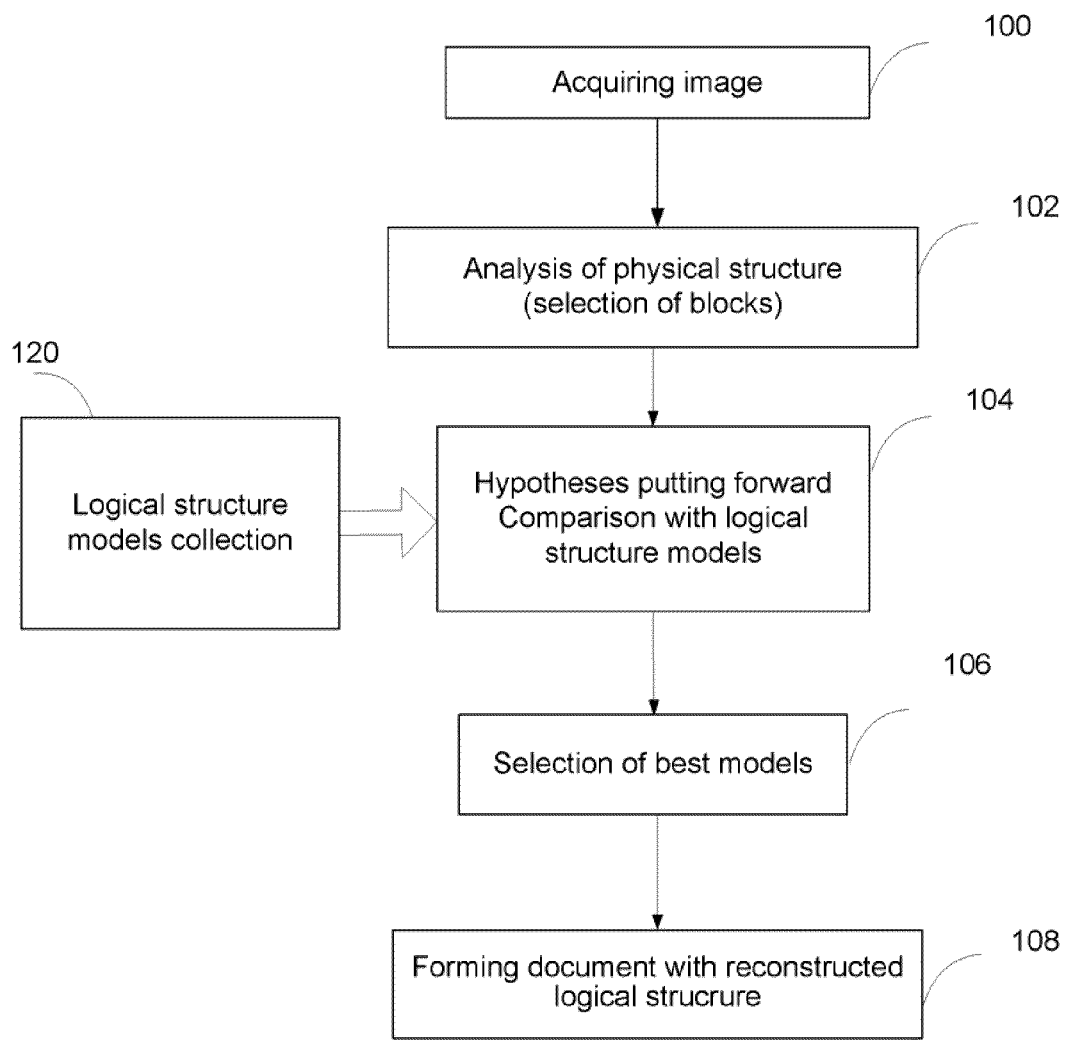
FIG. 1 shows a flowchart for recognizing a model of a document, in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative-embodiments mutually exclusive of other embodiments. Moreover, various features are described which may be exhibited by some embodiments and not by others. Similarly, various requirements are described which may be requirements for some embodiments but not other embodiments.

Embodiments of the invention disclose a method and a system for efficient recognition of the logical structure of a document comprising form elements such as images, tables, pages, headings, chapters, sections, separators, paragraphs, sub-headings, tables of content, footnotes, references, bibliographies, abstracts, figures. The form elements may have particular formatting. For example, a paragraph may be formatted to have s multiple columns, or a page form element may be formatted to have a header and/or footer. In accordance with embodiments of the present invention, a result of OCR (ICR) is an editable text document that replicates the logical structure, layout, formatting, etc. of the original paper document or document image that was fed to the system. Broading, in one embodiment, the method comprises the following steps:

generating at least one document hypothesis for the whole document;

for each document hypothesis, verifying said document hypothesis including (a) generating at least one block hypothesis for each block in the document based on the document hypothesis; and (b) selecting a best block hypothesis for each block;

selecting as a best document hypothesis the document hypothesis that has the best degree of correspondence with the selected best block hypotheses for the document; and forming the document based on the best document In one embodiment, the system comprises an imaging device connected to a computer with specially designed OCR (ICR) software. The system is used to scan a paper document (source document) to produce a document image thereof. The document may have several form elements. For example the document may have several font types, fonts of different sizes, several different blocks or areas of text, tables, separators (e.g. horizontal or vertical lines), etc. In one embodiment, the OCR software analyzes the mutual arrangement of the above form elements and compares it with the descriptions of possible logical structures available to it in order to generate a hypothesis about the logical structure of the source document. Then the hypothesis is verified and the recognized text is transformed to reproduce the native formatting of the source document. Finally, the recognized text is exported into an extended editable document format, for example, Microsoft Word, RTF, Tagged PDF.

In another embodiment, the recognized logical structure is used to arrive at conclusions about the model, type, and style of the document. For example, the system may determine whether it is a business letter, a contract, a legal document, a certificate, an application, etc. The system stores a collection of models, each of which describes one or more possible logical structures. In one embodiment, the system generates (puts forward) a plurality of hypotheses, each corresponding to a model in the system. Then the system recognizes the document and checks how well each of the generated hypotheses corresponds to the actual properties of the document. The system evaluates each hypothesis based on the degree of correspondence. Subsequently, the system selects the model that corresponds to the best hypothesis, i.e. the hypothesis with the highest correlation with the actual properties of the document.

In order to process the document image so that its logical structure is correctly reconstructed, in one embodiment, the system is provisioned with information about the possible mutual arrangement of form elements. As noted above the form elements include elements such as columns (main text), headers and footers, endnotes and footnotes, an abstract (text fragment below the title), headings (together with their hierarchy and numbering), a table of contents, a list of figures, bibliography, the document's title, the numbers and captions of figures and tables, etc.

The correct recognition of the logical structure of a document ensures the correct reading order, the correct association of captions, the correct reproduction of the styles and headers/footers, and the ability to recreate hyperlinks in the document. Advantageously, an OCR system capable of recognizing the logical structure in accordance with the techniques disclosed herein will output not plain text, but a structured object reproducing the native formatting. This object can be exported into structured formats (extended document formats), such as Rich Text Format (RTF), Hyper Text Markup Language (HTML), or Tagged Portable Document Format (PDF).

Advantageously, the correct recognition of the logical structure of a document enables the system to preserve the basic layout of the source document and to classify documents according to their types, including spreadsheets, magazine articles, contracts, and even faxes. As a result, the headers and footers, page numbering, footnotes, and fonts and styles of the original are retained. For example, footnotes linked with their corresponding text on the page, image captions, graphics, and tables may be automatically grouped with the appropriate object type. Headers and footers can be directly edited or even removed using the header and footer tools provided by any text editing software. Text flows are maintained across multiple pages. A variety of additional formatting elements, including line numbering, signatures, and stamps found in legal and other documents, may be recognized and retained.

In one embodiment, the system analyzes a document in its entirety rather than page by page. In one embodiment, the building block of the logical structure is a paragraph. A page may consist of sections, headers/footers, text inserts, pictures, photos, among others. One image may correspond to two facing pages, and in this case it is processed as two pages. A section may comprise columns and section-level inserts. An article printed in two columns with one general title and an abstract is treated as having two sections. A column may comprise text, figures, and tables supplied with captions. A captioned figure or a captioned table may also be part of an insert. Inserts may also include any text.

FIG. 1 of the drawings shows processing blocks performed to recognize the logical structure of a document and its model, in accordance with one embodiment of the invention. Referring to FIG. 1, at block 100 a document image is acquired, e.g. from an imaging device.

At block 102, by means of OCR software, the physical structure of the document is analyzed, and in particular, blocks are detected. The blocks may comprise text, pictures, tables, etc. In one embodiment, text occurring in the block may be clustered based on the properties of its font, i.e. a font which is only slightly different from the main font, which may be the result of incorrect OCR, is also considered as the main font.

Next, at block 104, at least one document hypothesis about possible logical structure of the document is generated. The document hypotheses are generated on the basis of a collection of models 120 of possible document logical structures. In one embodiment, the collection of models 120 of possible logical structures may includes models of different documents, for example, a research paper, a patent, a patent application, business letter, a contract, an agreement, etc. Each model may describe a set of essential and possible elements of logical structure and their mutual arrangement within the model. In one embodiment, for example, one of possible models of a research paper may include a title, an authors information, an abstract, an issue name, an issue number, and an issue date within page footer or page header, tables, pictures, diagrams, endnotes and footnotes, bibliography, flowcharts and other.

The collection of models may be structured. In one embodiment, the most probable document hypothesis may be generated first, the next most probable document hypothesis is generated second, and so forth.

Then each document hypothesis is verified. Verifying each document hypothesis includes generating, for each text block, one or more block hypotheses. For example, in one embodiment, the system may hypothesize that the one- or two-line blocks at the very bottom (at the very top) of the page are footers (headers). In another embodiment, the system generates a header (footer) hypothesis for standalone text paragraphs of not more than three lines which are separated from the body text by a sufficiently large interval. As an additional constraint, the height of the header/footer lines may not be greater than the height of the lines in the rest of the text. To verify the hypothesis, the system checks if the assumed header/footer indeed recurs on each page, as may be required by a model in the system.

In one embodiment, various models of document headers/footers are available to the system. Various methods may be used to specify the said models. The only requirement is that a method establishes a spatial relation for the elements of the model (i.e. their location relative to the rest of the text). For example, the following header/footer models can be used:

1. Page number. Headers/footers may consist of an Arabic numeral (or, less frequently, a Roman numeral, or a letter and numeral combination, such as A1, A2, A3 . . . ) and, may be, a short word, for example "page," patterned on a known model and changing from page to page.

2. Document attribute. An attribute may be the title, the author, or copyright owner of the document, among other things. A document attribute remains unchanged throughout the entire document.

3. Document part attribute (e.g. a chapter title). Remains unchanged on several consecutive pages, then ceases to recur.

4. Header/footer which changes from page to page but which is not described by the "page number" model above (e.g. headers in dictionaries, where the first word on the page is used as a header).

5. A combination of a document attribute or document part attribute and a page number (as in this document).

Blocks printed in fonts that are much larger than the fonts in the rest of the text or in bold fonts are considered as possible candidates for headings of different levels. The hierarchy of headings is reconstructed based on their numbering and font sizes. The reconstructed hierarchy is then used to assign the correct styles to the text fragments in the recognized document and to build a table of contents.

In one embodiment, the system generates hypotheses about figure and table captions, which are usually formatted in a style of their own and are located below, above, or, less commonly, to the side of the figure or table.

In one embodiment, the system generates hypotheses about footnotes and endnotes. Endnotes are searched for based on their typical spatial location and superscript indexes at the beginning of blocks. Footnotes are always located at the bottom of a page, only footers may be located below them. Footnotes are commonly separated from the body text by a horizontal line. Spatially, footnotes may be located immediately below the column to which they refer, or in a separate section below the columns, or in an insert in the bottom left-hand corner below multi-column text.

In some cases, the text of a footnote may carry over to the next page. These cases can be handled as follows. Once the system has detected the footnotes, it searches for their continuations: on all the pages that follow the pages with the detected footnotes, the system looks for paragraphs at the bottom of the page that have the same formatting as the detected footnotes. This method may work if the formatting of the footnotes differs considerably from the formatting of the column.

In one embodiment, the system searches for a table of contents by comparing the detected objects against the table of contents model stored in the collection 120. In another embodiment, a table of contents may be detected based on the tab leader dots or, if there are no dots, based on the numbers at the ends of the lines and the tabulation that precedes the numbers.

According to the present invention, a style describes font types and paragraph formatting. This corresponds to the notion of style as used in extended editable formats, for example, in RTF. As a result of the block 104, each hypothesis for each block contains, besides information about the logical structure, information about the style.

In one embodiment, each block hypothesis is verified. This includes comparing each block hypothesis with block models of-possible logical structures for each block. Thus, the collection 120 also includes models of block logical structures, in one embodiment. Each block hypothesis is compared or evaluated on the basis of a degree of correspondence between the block hypothesis and each of the block models. Verifying each block hypothesis also includes selecting, at block 106, one or more best document models. The document hypothesis that correlates best with the entire document is selected as the best model of the document. In one embodiment, the best model may be selected automatically by the OCR system. In another embodiment, the best model may be selected manually by the user from among several models.

At block 108, the document with the recognized logical structure is formed and saved in an extended format in a memory.

Figure 2:
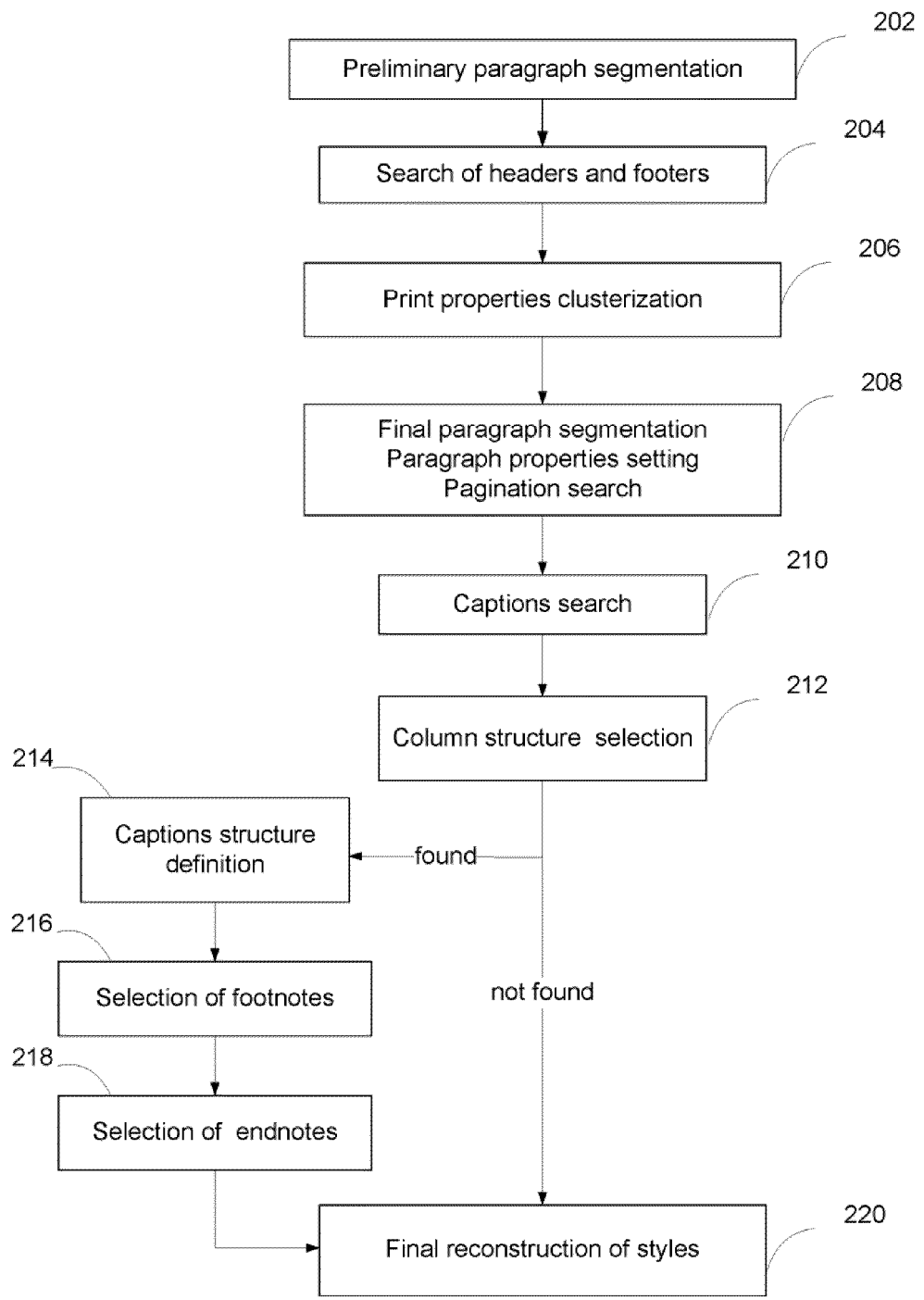
FIG. 2 shows a flowchart for recognizing the logical structure of a document, in accordance with one embodiment of the invention.

FIG. 2 of the drawings shows a flowchart of a possible sequence of actions for each generated hypothesis at the block 104 in accordance with one embodiment of the invention. Referring to FIG. 2, at block 202 the system performs a preliminary segmentation of the document into paragraphs. At block 204, the system looks for headers and footers. At block 206, the text is clustered based on the font properties. At block 208, the final division into paragraphs is performed and paragraph properties are assigned. Numberings are also searched for at this stage.

At block 210, captions are detected and processed. At block 212, columns are detected. If columns are detected, at block 214 the system creates a heading structure, and at blocks 216 and 216 footnotes and endnotes are detected.

At block 220, the final reconstruction of styles of entire document is provided.

Figure 3:
FIG. 3 shows an example of a document with selected elements of physical structure, in accordance with one embodiment of the invention.

FIG. 3 shows an example of a multipage document in which certain elements of physical structure, including a header 301, a title 302, a subtitle 302, inserts 304, 306, 308 and 309, a picture 310, footers 307 and 312 may be seen. These elements of physical structure have been selected for illustrative purposes only and are not intended to limit the scope of the invention in any way. In accordance with the techniques disclosed herein the system can detect that the text body contains two columns 305 and 311. Since the document may have page numbering, the system can recognize this too, and this hypothesis is verified on the others pages of the document.

Figure 3A:
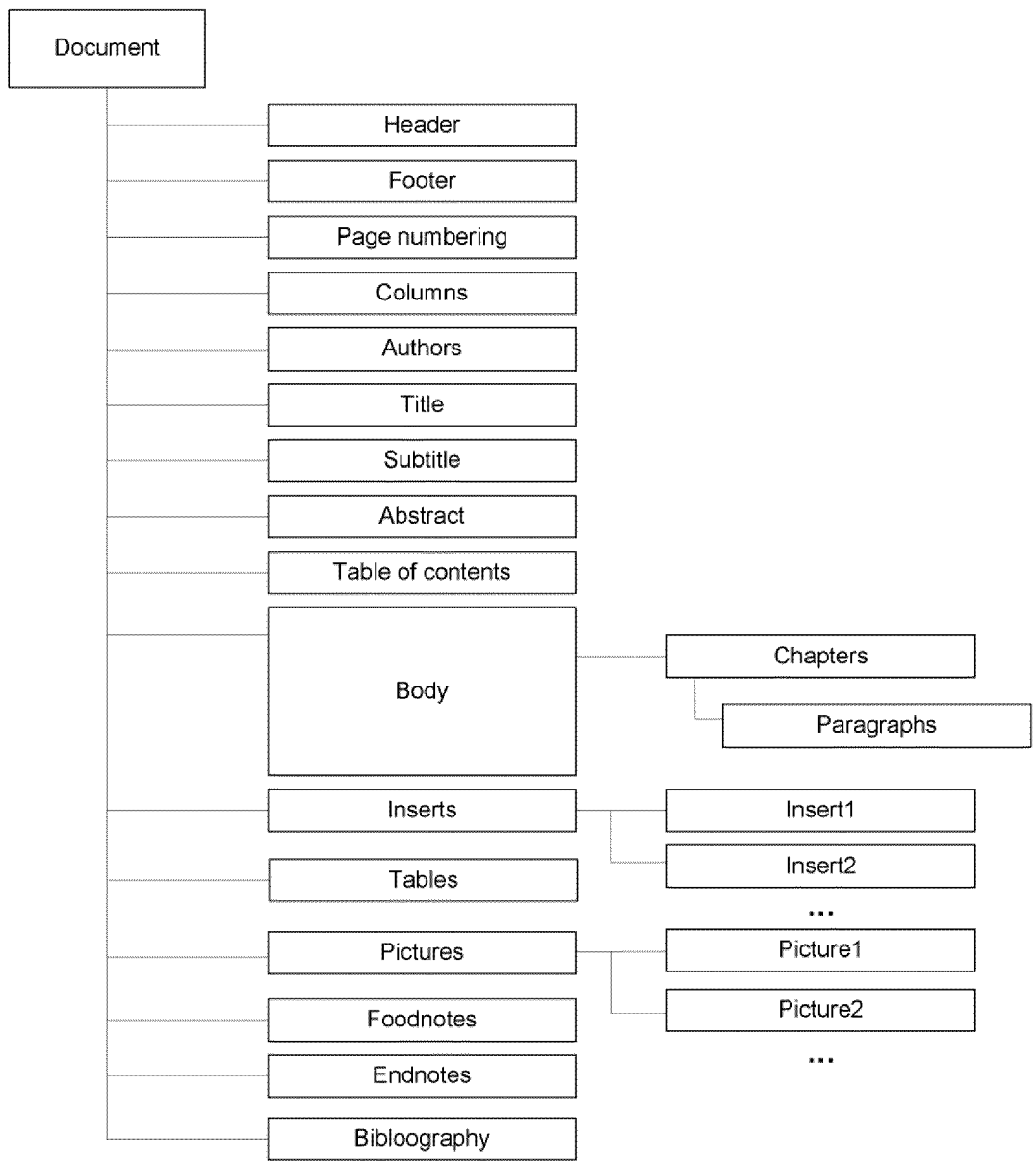
FIG. 3A shows an example of a document's logical structure description, in accordance with one embodiment of the invention.

FIG. 3A of the drawings shows an approximate example of a document's logical structure description. The logical structure is determined as a result of the OCR process disclosed herein. The elements of the logical structure description of FIG. 3A correspond to the form elements of the physical structure of FIG. 3, but with the meaning of and the relations between the form elements defined. The logical structure may be hierarchical, and the relations between the form elements may describe, for example, that the body includes chapters, subchapters, etc. with their numberings. Each chapter and subchapter may contain paragraphs, peculiar set of tables or/and pictures with their peculiar numberings and specific arrangement. Hereby some elements of the logical structure may have their parent elements.

Figure 4:
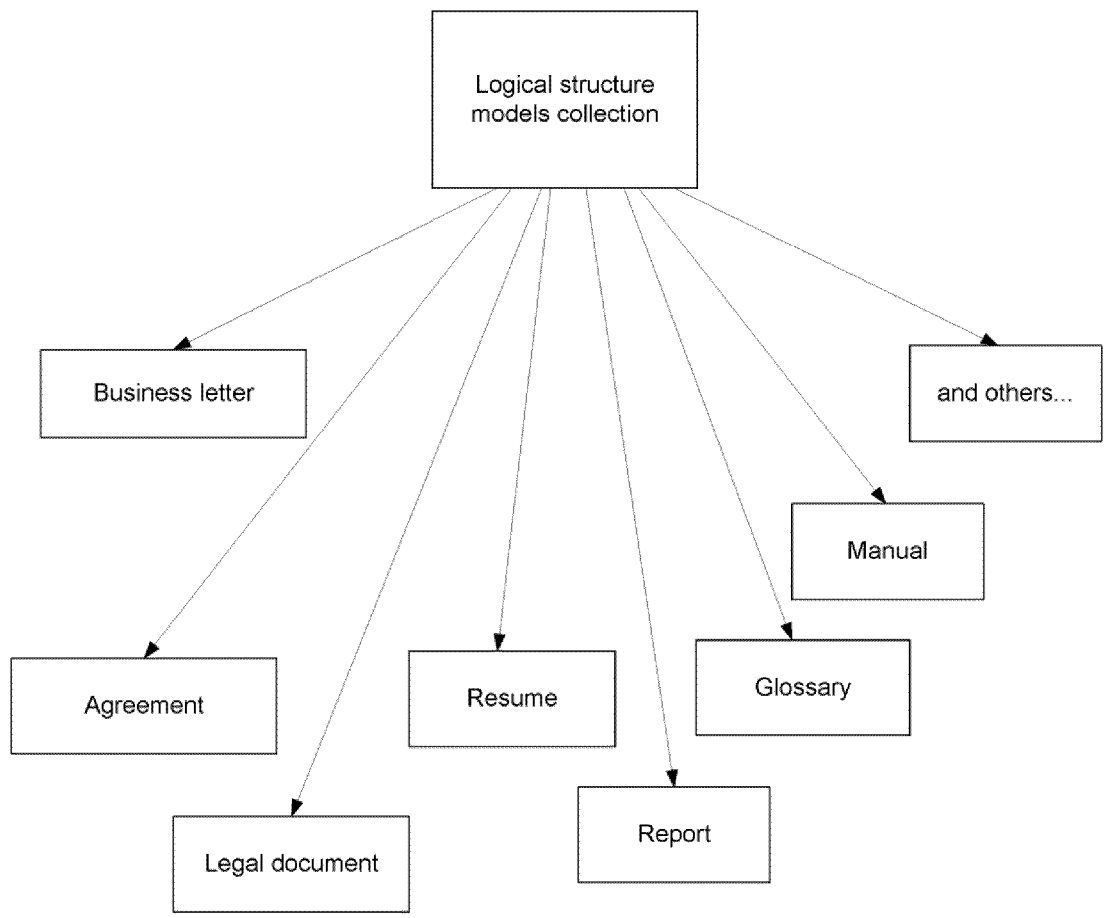
FIG. 4 shows an example description of a collection of document models, in accordance with one embodiment of the invention.

FIG. 4 shows an exemplary collection of document models with which the system of the present invention may be provisioned, in accordance with one embodiment. The collection of models may include, for example, models for Agreements, Business letters, Legal documents, Resume, Reports, Glossaries, Manuals, and many others. The collection of models may be extended and enriched, for example, by users.

Figure 5:
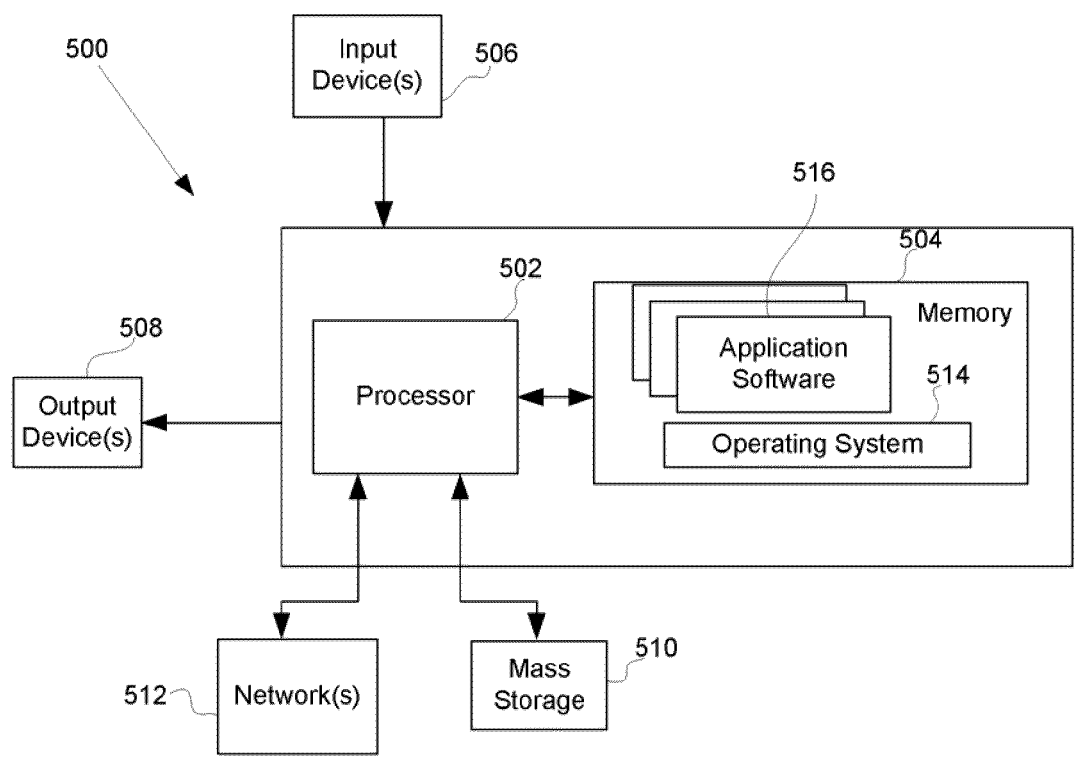
FIG. 5 shows a block diagram of hardware for an OCR system, in accordance with one embodiment of the invention.

FIG. 5 of the drawings shows an example of hardware 500 that may be used to implement the system, in accordance with one embodiment of the invention. The hardware 500 typically includes at least one processor 502 coupled to a memory 504. The processor 502 may represent one or more processors (e.g., microprocessors), and the memory 504 may represent random access memory (RAM) devices comprising a main storage of the hardware 500, as well as any supplemental levels of memory, e.g., cache memories, non-volatile or backup memories (e.g. programmable or flash memories), read-only memories, etc. In addition, the memory 504 may be considered to include memory storage physically located elsewhere in the hardware 500, e.g. any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, imaging device, scanner, etc.) and a one or more output devices 508 (e.g., a Liquid Crystal Display (LCD) panel, a sound playback device (speaker).

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to, implement the techniques described above. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A method for determining a logical structure of a document, the method comprising:
   acquiring an image of the document;
   identifying one or more blocks in the image of the document;
   generating a hypothesis for at least one of the identified blocks in the image of the document (a "block hypothesis");
   generating at least one document hypothesis for the image of the document, wherein said generating included referencing a plurality of document models, wherein each document model describes one or more possible logical structures, and wherein such logical structures are based on the presence of one or more blocks;
   selecting a document hypothesis based on its degree of correspondence with at least one block hypothesis; and
   forming a representation of the document based on the selected document hypothesis.

2. The method of claim 1, wherein the generating the at least one document hypothesis for the image of the document includes generating a plurality of document hypotheses in order of differing probabilities.

3. The method of claim 1,
   wherein indentifying the one or more blocks includes performing a physical structure analysis to identify each said one or more blocks.

4. The method of claim 1, the method further comprising:
   saving the representation of the document in an extended format in a memory.

5. The method of claim 1, wherein the generating the at least one document hypothesis for the image of the document is based on information about a possible arrangement of blocks in the image of the document.

6. The method of claim 1, wherein said generating the hypothesis for at least one of the identified blocks in the document is based on the at least one document hypothesis.

7. The method of claim 1, wherein generating the hypothesis for at least one of the identified blocks includes generating a hypothesis for each identified block in the image of the document.

8. The method of claim 1, wherein a block comprises one or more form elements.

9. A system comprising:
a processor; and
a memory coupled to the processor, the memory storing instructions which when executed by the processor, cause the system to perform a method for determining a logical structure for a document, comprising:
identifying one or more blocks in an image of the document;
generating a hypothesis for at least one of the identified blocks in the image of the document;
generating at least one document hypothesis for the image of the document, wherein said generating includes referencing a plurality of document models, wherein each document model describes one or more possible logical structures, and wherein such logical structures are based on the presence of one or more blocks;
selecting a document hypothesis based on its degree of correspondence with at least one block hypothesis; and
forming a representation of the document based on the selected document hypothesis.

10. The system of claim 1, wherein the generating the at least one document hypothesis for the document includes generating a plurality of document hypotheses in order of differing probabilities.

11. The system of claim 1, wherein wherein identifying the one or more blocks includes performing a physical structure analysis to identify each said one or more blocks.

12. The system of claim 1, wherein the method further comprises saving the representation of the document in an extended format in a memory.

13. The system of claim 1, wherein the document hypothesis is selected automatically.

14. The system of claim 1, wherein the document hypothesis is selected by receiving a selection through a user interface element.

15. The system of claim 1, wherein the generating the at least one document hypothesis for the image of the document is based on information about a possible arrangement of blocks in the image of the document.

16. A non-transitory computer-readable medium having stored thereon instructions which when executed by a computer, cause the computer to perform a method for determining a logical structure for a document, comprising:
identifying one or more blocks in an image of the document;
generating a hypothesis for at least one of the identified blocks in the image of the document;
generating at least one document hypothesis for the image of the document, wherein said generating includes referencing a plurality of document models, wherein each document model describes one or more possible logical structures, and wherein such logical structures are based on the presence of one or more blocks;
selecting a document hypothesis based on its degree of correspondence with at least one block hypothesis; and
forming a representation of the document based on the selected document hypothesis.

17. The non-transitory computer-readable medium of claim 16, wherein the generating includes generating a plurality of document hypotheses in order of differing probabilities.

18. The non-transitory computer-readable medium of claim 16, wherein wherein identifying the one or more blocks includes performing a physical structure analysis to identify each said one or more blocks.

19. The non-transitory computer-readable medium of claim 16, wherein the method further comprises saving a representation of the document in an extended format in a memory.

20. The non-transitory computer-readable medium of claim 16, wherein the document hypothesis is selected automatically.

21. The non-transitory computer-readable medium of claim 16, wherein the document hypothesis is selected by receiving a selection through a user interface element.

22. The method of claim 1, wherein generating said at least one document hypothesis includes comparing the hypothesis for said at least one of the identified blocks against a block model representing a possible logical structure for a corresponding block.

23. The method of claim 1, wherein generating said at least one document hypothesis includes comparing the hypothesis for said at least one of the identified blocks on the basis of a degree of correspondence between the hypothesis for said at least one of the identified blocks and each of a plurality of block models.

* * * * *